J. KAST.
APPARATUS FOR RECTIFYING SPIRITS.
No. 195,376.          Patented Sept. 18, 1877.
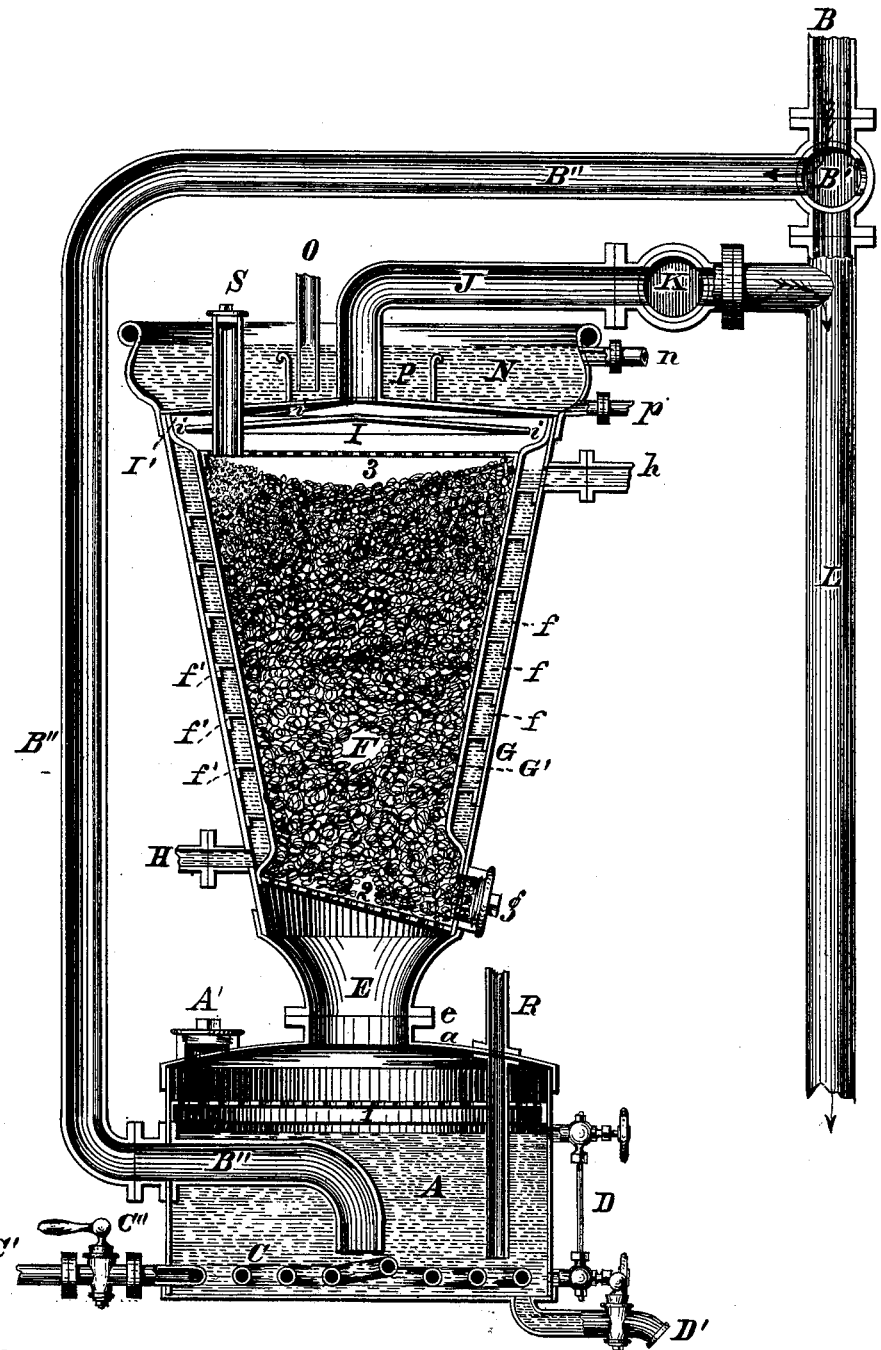
Witnesses:
Frank Hirsch
Chas. Bevsart
Inventor:
Joseph Kast
by Michael J. Stark, his Atty.

UNITED STATES PATENT OFFICE.

JOSEPH KAST, OF BUFFALO, NEW YORK, ASSIGNOR OF A PART OF HIS RIGHT TO TRUMAN STONE, FRANK EWENS, AND CHAS. F. BITTER, OF SAME PLACE.

IMPROVEMENT IN APPARATUS FOR RECTIFYING SPIRITS.

Specification forming part of Letters Patent No. 195,376, dated September 18, 1877; application filed June 23, 1877.

*To all whom it may concern:*

Be it known that I, JOSEPH KAST, of Buffalo, in the county of Erie and State of New York, have invented certain new and useful Improvements on a Still for Rectifying Spirits; and I do hereby declare that the following description of my said invention, taken in connection with the accompanying sheet of drawings, forms a full, clear, and exact specification, which will enable others skilled in the art to which it appertains to make and use the same.

My present invention relates to apparatus for the rectification of spirits; and it consists in the peculiar arrangement of parts and details of construction, as hereinafter fully described.

In the accompanying sheet of drawings hereinbefore mentioned the figure is a longitudinal sectional elevation of my improved apparatus for rectifying spirits.

A is a copper vessel resembling somewhat the common still. It is provided in its lower part with a steam-coil, C, which is in communication with the steam-generator by means of the pipe C', having the stop-cock C'' for regulating the supply of steam. It is further provided in its interior with a perforated diaphragm, 1, placed near the top or crown $a$ of said vessel. To the exterior of the vessel A is fitted an indicator, D, the draw-off cock D', and a screw-plug, A', the latter serving as a means for obtaining access to the interior of the vessel A above the diaphragm 1. The vessel A is in communication with a conical receptacle, F, by means of the neck E, both parts being flanged at $e$. This receptacle F consists of a double shell, of which the interior one is made sufficiently smaller to produce a water-space, $f$, and on its both extremities swelled so as to fit the exterior shell G. Near the lower junction of these shells is placed an inclined perforated diaphragm, 2, and near the upper junction the horizontal perforated diaphragm 3. The lower extremity of the shell G is provided with a screw-plug, $g$, and, just above the lower junction of the two shells F G, with an induction-pipe, H. The space between the shells is partitioned by means of the helical strip $f'$, wound spirally around either the exterior of the inner or the interior of the outer shell. The upper extremity of the shell G is provided with an eduction-pipe, $h$, and it is covered by means of the head I', made in a convexo-concave shape. Below this head I' is placed a convexo-concave diaphragm, I, of less diameter than the said head, so as to produce the annular passage $i$. Leading from the head I' is a pipe, J, provided with a stop-cock, K, to connect the interior of the vessel F with the pipe L leading to the coil-condenser. The vessel F is provided with an extension, N, serving as a water-receptacle, it being fitted with a supply-pipe, O, an overflow, $n$, and a draw-off, $p$. The supply-pipe leads into an annular space, P, around the pipe J, so as to bring the comparatively cooled supply of water nearest to said pipe J. Passing through the extension N, head I', deflector I, and perforated diaphragm 3, is a filling-pipe, S, by means of which the interior of the vessel F is charged with charcoal.

The operation of my apparatus is as follows: The low wines coming from the goose through the pipe B pass through the three-way cock B' and the pipe L to the worm-condenser. As soon as these low wines reach a certain standard—say about 180°—the three-way cock is turned so as to lead the spirits through the pipe B'' into the vessel A, from whence they will ascend, and, passing through the three diaphrams 1, 2, and 3 and the charcoal deposit between the diaphragms 2 and 3, deposit the fusel-oil and other heavier substances therein, which heavier substances may, by application of heat from the coil C, be again boiled, and thereby cause a further separation and the production of high sweet spirits. The contents of the vessel A are drawn off through the faucet D' as often as necessary, the height thereof being ascertainable by the glass indicator D.

To produce the desired low temperature within the vessel F, it is surrounded by the water-space $f$, which is supplied by the induction-pipe H in the lowest part thereof, and with the escape-pipe $h$ in its highest point.

For this same reason the top of said vessel is is also covered with a stratum of water supplied by the pipe O.

In order to clean the interior of the vessels A and F after use, and also the charcoal-filling without removing, the vessel A is provided with the steam-pipe R, by means of which a current of steam is passed through the entire apparatus, and thereby the desired result obtained in a quick and very efficient manner.

The hereinbefore-described apparatus is adapted to be used either as a rectifier, or as a combined still and rectifier, and also to give any desired scent or flavor to the spirits. This latter feature is accomplished by the introduction into the vessel A of the perforated diaphragm 1, the ingredients used for such purpose being introduced into said vessel through the screw-plugged passage A', and rest upon said diaphragm, so that the ascending spirits are first passed through the said ingredients to absorb the essential oils or other substances contained therein, and then through the separator F. It will be seen that in the latter the diaphragm 2 is inclined toward the exit g, which enables the discharge of the entire charcoal-filling by gravitation as soon as the screw-plug g or its equivalent is opened.

It will be observed that the pipe B'' enters the vessel A from the side. This is not a material or essential feature of my device, and may be changed to accommodate the building and other arrangements used in connection with distilling apparatus, so long as the pipe B'' enters the said vessel and has its exit-opening near the steam-coil C.

When it is desired to remove the contents of the vessel F the screw-plug G is opened, through which said contents may be readily withdrawn.

Having thus fully described my invention, I desire to secure to me by Letters Patent of the United States—

1. The combination, with the vessel A, of the pipe B, three-way cock B', pipe B'', separator F, pipe J, having the stop-cock K, and the pipe L, as stated.

2. A separator consisting, essentially, of the tapering shell G, provided in its interior with the shell G', having both its extremities swelled to fit the said exterior shell G, and thereby to afford an uninterrupted water-space, f, around the said interior shell, substantially as specified.

3. The combination, with the vessel F, of the inclined perforated diaphragm 2 and the screw-plug g, located in the lower part of said vessel F, substantially as specified, whereby the contents of said vessel discharge by gravitation, as described.

4. The separator F, consisting, essentially, of two connected shells, G G', provided with the helical water-passage f, the inclined perforated diaphragm 2, horizontal diaphragm 3, deflector I, head I', escape-pipe J, and the filling-plug S, substantially as hereinbefore set forth and described.

5. The combination, with the vessel A, of the steam-coil C, supply-pipe B'', diaphragm 1, and the separator F.

6. The combination, with the shells G G', of the spiral f', whereby the ascending current of water is caused to move spirally upward, for the purpose specified.

7. The combination, with the receiver N, of the annular receiver P, as stated.

8. The combination, with the vessel A and separator F, of the pipe R, arranged to reach within a short distance from the bottom of said vessel A, whereby, by admitting a current of steam within said vessel, the entire apparatus can be cleaned without removing the contents of said separator, all as hereinbefore set forth and specified.

In testimony that I claim the foregoing as my invention I have hereto set my hand in the presence of two subscribing witnesses.

JOSEPH KAST.

Attest:
MICHAEL J. STARK,
FRANK HIRSCH.